(12) United States Patent
Sugita et al.

(10) Patent No.: US 6,258,475 B1
(45) Date of Patent: Jul. 10, 2001

(54) FASTENING STRUCTURE FOR FUEL CELL STACK

(75) Inventors: Narutoshi Sugita, Asaka; Koji Okazaki, Shiki; Takeshi Yamagami, Omiya; Takashi Komura, Saitama-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/249,218

(22) Filed: Feb. 12, 1999

(30) Foreign Application Priority Data

Feb. 17, 1998 (JP) .................................................. 10-035153

(51) Int. Cl.[7] .............................. H01M 8/24; H01M 8/02
(52) U.S. Cl. ............................................. 429/34; 429/12
(58) Field of Search ................................. 429/34–37, 27, 429/12, 25

(56) References Cited

U.S. PATENT DOCUMENTS 4,560,626 * 12/1985 Joy ........................................ 429/27
4,973,531 * 11/1990 Zaima .................................... 429/37
5,547,776 * 8/1996 Fletcher ................................. 429/13

FOREIGN PATENT DOCUMENTS 58-161168   9/1983   (JP) .

* cited by examiner

Primary Examiner—Carol Chaney
Assistant Examiner—Mark Ruthkosky
(74) Attorney, Agent, or Firm—Lahive & Cockfield, LLP (57) ABSTRACT

A fuel cell stack has a plurality of fuel cells, separators sandwiching each of the fuel cells, and first and second end plates disposed on respective opposite ends of the plurality of fuel cells. A fastening structure incorporated in the fuel cell stack has a liquid chamber disposed on an outer surface of the first end plate, a silicone oil filled in the liquid chamber, and a pressurizing mechanism disposed on an outer surface of the second end plate, for pressing the fuel cells toward the first end plate. The plurality of fuel cells is given a uniform surface pressure, and can be reduced in weight and made compact.

12 Claims, 11 Drawing Sheets

FASTENING STRUCTURE FOR FUEL CELL STACK

BACKGROUND OF THE INVENTION

1. Field of the Invention

The present invention relates to a fastening structure for fuel cell stack made up from a plurality of a fuel cells each comprising an anode electrode and a cathode electrode which are disposed in facing relation to each other with an electrolyte interposed therebetween. The fuel cells are stacked with separators interposed therebetween and end plates disposed on respective opposite ends of the plurality of fuel cells.

2. Description of the Related Art

A known type of fuel cell stack comprises a plurality of fuel cells alternating with separators, wherein each of the fuel cells comprises an anode electrode and a cathode electrode which are disposed in facing relation to each other with a solid polymer electrolyte membrane interposed therebetween. The known fuel cell stack operates as follows: A hydrogen containing gas, i.e., a fuel gas, supplied to the anode electrode is converted into hydrogen ions on a catalytic electrode, and the hydrogen ions move through the solid polymer electrolyte membrane, which is appropriately humidified, toward the cathode electrode. Electrons which are generated in connection with the movement of the hydrogen ions are supplied to an external circuit for use as DC electric energy. Since the cathode electrode is supplied with an oxidizing gas such as an oxygen gas or air, the hydrogen ions, the electrons, and the oxygen react to form water on the cathode electrode.

If the contact resistance in the fuel cells increases, then the internal resistance causes an increased loss, resulting in a drop in the voltage across the fuel cell stack. Therefore, it is necessary to exert predetermined fastening forces on the fuel cells, for thereby applying a uniform pressure to the electrode surfaces, in order to reduce the contact resistance.

Japanese laid-open patent publication No. 58-164168, for example, discloses a fuel cell stack which comprises stacked cell blocks each comprising a stack of unit cells alternating with separator plates, rigid intermediate plates interposed between the cell blocks, and a pair of end plates placed on respective opposite ends of the cell block stack. The stacked cell blocks are fastened together by bolts extending through the separator plates and the end plates. Sealed receptacles that are filled with a liquid are inserted between the intermediate and end plates and the cell blocks. The sealed receptacles are of a size large enough to cover the entire end surfaces of the corresponding cell blocks and have flexible end walls held in contact with those cell blocks. The sealed receptacles are held in fluid communication with each other by conduits.

However, the disclosed fuel cell stack suffers a disadvantage in that since the liquid-filled sealed receptacles are inserted between the intermediate and end plates and the cell blocks, passages for a hydrogen containing gas, an oxidizing gas, and a coolant to be supplied to the cell blocks cannot be defined in the intermediate and end plates and the cell blocks. Therefore, the fuel cell stack needs to have additional passages, extending around the intermediate and end plates and the cell blocks, for passing a hydrogen containing gas, an oxidizing gas, and a coolant. As a result, the fuel cell stack is relatively complex in its overall structure, and cannot be reduced in weight and made compact.

Furthermore, the cell blocks are associated with the respective liquid-filled sealed receptacles which communicate with each other. Consequently, it is not possible to control the fastening forces individually for the respective cell blocks.

SUMMARY OF THE INVENTION

It is a major object of the present invention to provide a fastening structure for a fuel cell stack, which is suitable to make the fuel cell stack lightweight and compact and is capable of reliably imparting optimum fastening forces to the fuel cell stack.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
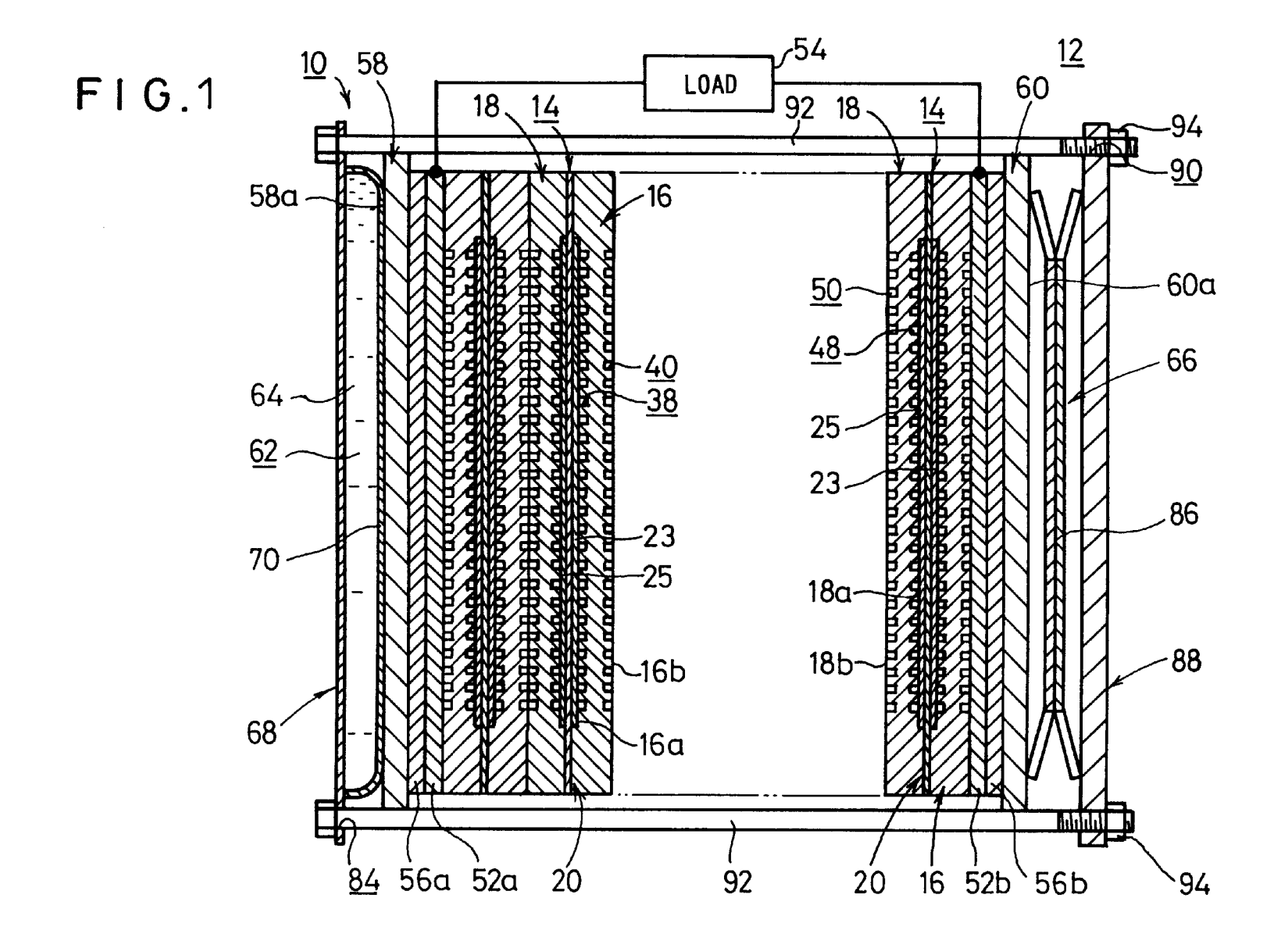
FIG. 1 is a horizontal cross-sectional view of a fuel cell stack which incorporates a fastening structure according to a first embodiment of the present invention.

As shown in FIG. 1, a fuel cell stack 12 incorporates a fastening structure 10 according to a first embodiment of the present invention.

In FIG. 1, the fuel cell stack 12 comprises a horizontal stack of fuel cells 14 each sandwiched between first and second separators 16, 18.

Figure 2:
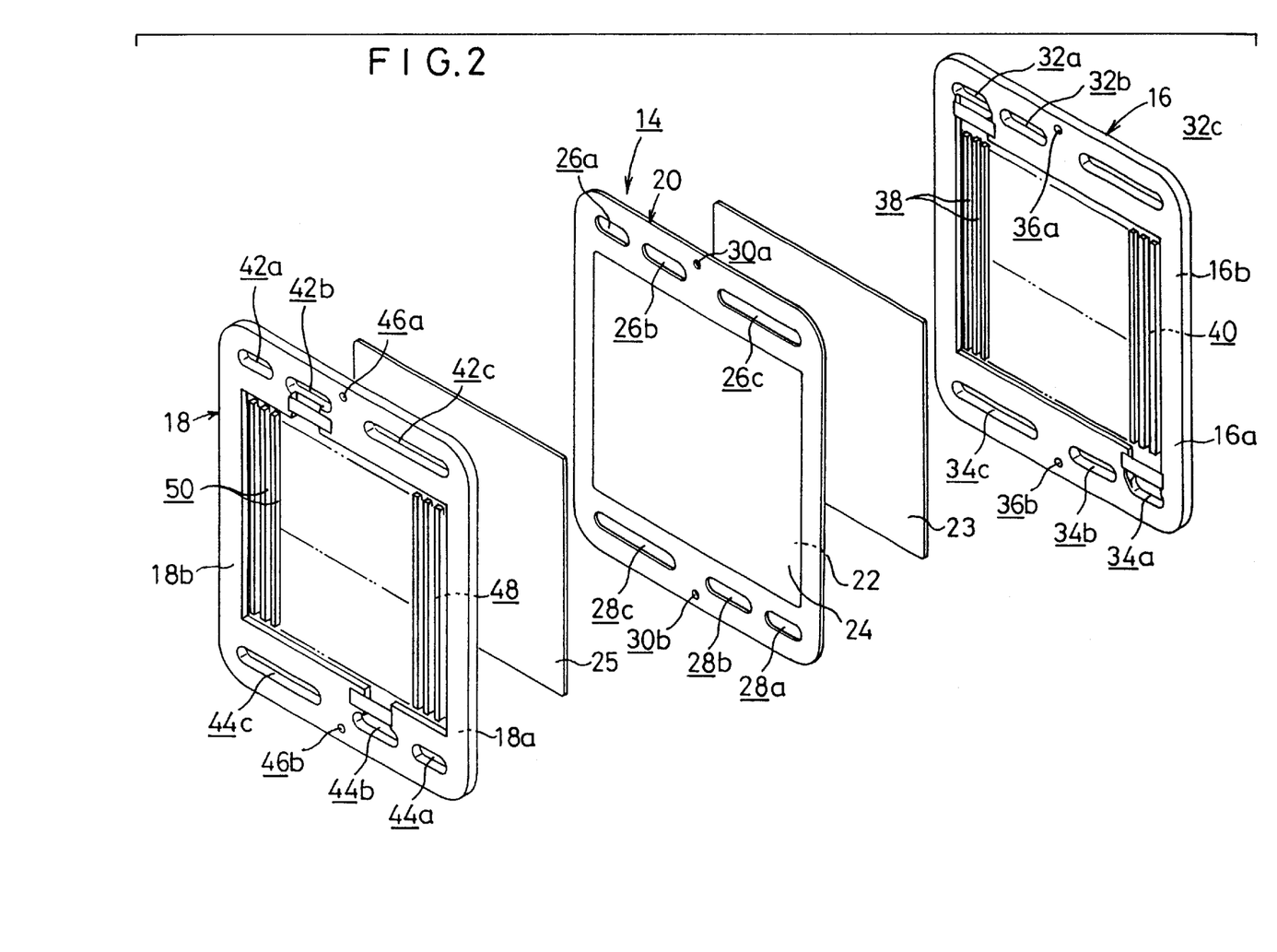
FIG. 2 is an exploded perspective view of a fuel cell of the fuel cell stack shown in FIG. 1.

As shown in FIG. 2, each of the fuel cells 14 comprises a solid polymer electrolyte membrane 20, an anode electrode 22 and a cathode electrode 24 which are disposed respectively on opposite surfaces of the solid polymer electrolyte membrane 20, and first and second gas diffusion layers 23, 25, each comprising a porous layer such as of carbon paper, disposed respectively on the anode electrode 22 and the cathode electrode 24.

The structure of each of the fuel cells 14 will be described in detail below with reference to FIG. 2.

The solid polymer electrolyte membrane 20 has defined in an upper region thereof a hole 26a for passing a fuel gas such as a hydrogen containing gas therethrough, a hole 26b for passing a coolant therethrough, and an oblong hole 26c for passing oxidizing gas such as air therethrough. The solid polymer electrolyte membrane 20 has defined in a lower region thereof a hole 28a for passing the fuel gas therethrough, a hole 28b for passing the coolant therethrough, and an oblong hole 28c for passing an oxidizing gas therethrough. The solid polymer electrolyte membrane 20 also has positioning holes 30a, 30b defined respectively in the upper and lower regions thereof.

The first separator 16, which comprises a plate, has defined in an upper region thereof a hole 32a for passing the fuel gas therethrough, a hole 32b for passing the coolant therethrough, and an oblong hole 32c for passing the oxidizing gas therethrough. The first separator 16 has defined in a lower region thereof a hole 34a for passing the fuel gas therethrough, a hole 34b for passing the coolant therethrough, and an oblong hole 34c for passing the oxidizing gas therethrough. The first separator 16 also has positioning holes 36a, 36b defined respectively in the upper and lower regions thereof.

The first separator 16 has a surface 16a facing the anode electrode 22. The surface 16a has a plurality of parallel vertical grooves 38 defined therein and communicating with the holes 32a, 34a for passing the fuel gas therethrough. The grooves 38 serve as a passage for passing the fuel gas from the hole 32a toward the hole 34a. The fuel gas is supplied through the grooves 38 to the anode electrode 22. The first separator 16 has an opposite surface 16b facing away from the anode electrode 22. The surface 16b has a plurality of parallel vertical grooves 40 defined therein and communicating with the holes 32b, 34b for passing the coolant therethrough.

The second separator 18, which also comprises a plate, has defined in an upper region thereof a hole 42a for passing the fuel gas therethrough, a hole 42b for passing the coolant therethrough, and an oblong hole 42c for passing the oxidizing gas therethrough. The second separator 18 has defined in a lower region thereof a hole 44a for passing the fuel gas therethrough, a hole 44b for passing the coolant therethrough, and an oblong hole 44c for passing the oxidizing gas therethrough. The second separator 18 also has positioning holes 46a, 46b defined respectively in the upper and lower regions thereof.

The second separator 18 has a surface 18a facing the cathode electrode 24. The surface 18a has a plurality of parallel vertical grooves 48 defined therein and communicating with the holes 42c, 44c for passing the oxidizing gas therethrough. The oxidizing gas is supplied through the grooves 48 to the cathode electrode 24. The second separator 18 has an opposite surface 18b facing away from the cathode electrode 24. The surface 18b has a plurality of parallel vertical grooves 50 defined therein and communicating with the holes 42b, 44b for passing the coolant therethrough. The grooves 50 in the second separator 18 and the grooves 40 in the first separator 16 jointly serve as a passage for the coolant.

As shown in FIG. 1, terminal plates 52a, 52b are disposed on respective ends of the horizontal stack of fuel cells 14. The terminal plates 52a, 52b are electrically connected to a load 54 for supplying electric energy discharged from the fuel cells 14 to the load 54. Insulating plates 56a, 56b are held against the respective terminal plates 52a, 52b remotely from the fuel cells 14, and first and second end plates 58, 60 are held against the respective first and second end plates 56a, 56b remotely from the terminal plates 52a, 52b. The first and second end plates 56a, 56b have holes (not shown) for supplying the fuel gas, the oxidizing gas, and the coolant to and discharging the fuel gas, the oxidizing gas, and the coolant from the stacked fuel cells 14. These holes in the first and second end plates 56a, 56b are connected to external devices (not shown).

The fastening structure 10 comprises a liquid chamber 62 disposed against an outer surface 58a of the first end plate 58 remote from an inner surface thereof which faces the fuel cells 14, a noncompressible surface-pressure generating liquid 64 such as silicone oil filled in the liquid chamber 62, and a pressurizing mechanism 66 held against an outer surface 60a of the second end plate 60 remote from an inner surface thereof which faces the fuel cells 14, for pressing the fuel cells 14 toward the first end plate 58.

A backup plate 68 is positioned next to the liquid chamber 62, which is sandwiched between the backup plate 68 and the first end plate 58. The backup plate 68 is thinner than the first end plate 58 and more flexible than the first end plate 58. A flexible metal sheet 70 such as a thin aluminum sheet is fixed by welding, brazing, or adhesive bonding to an inner surface of the backup plate 68 which faces the first end plate 58. The liquid chamber 62 is defined between the flexible metal sheet 70 and the backup plate 68.

Figure 3:
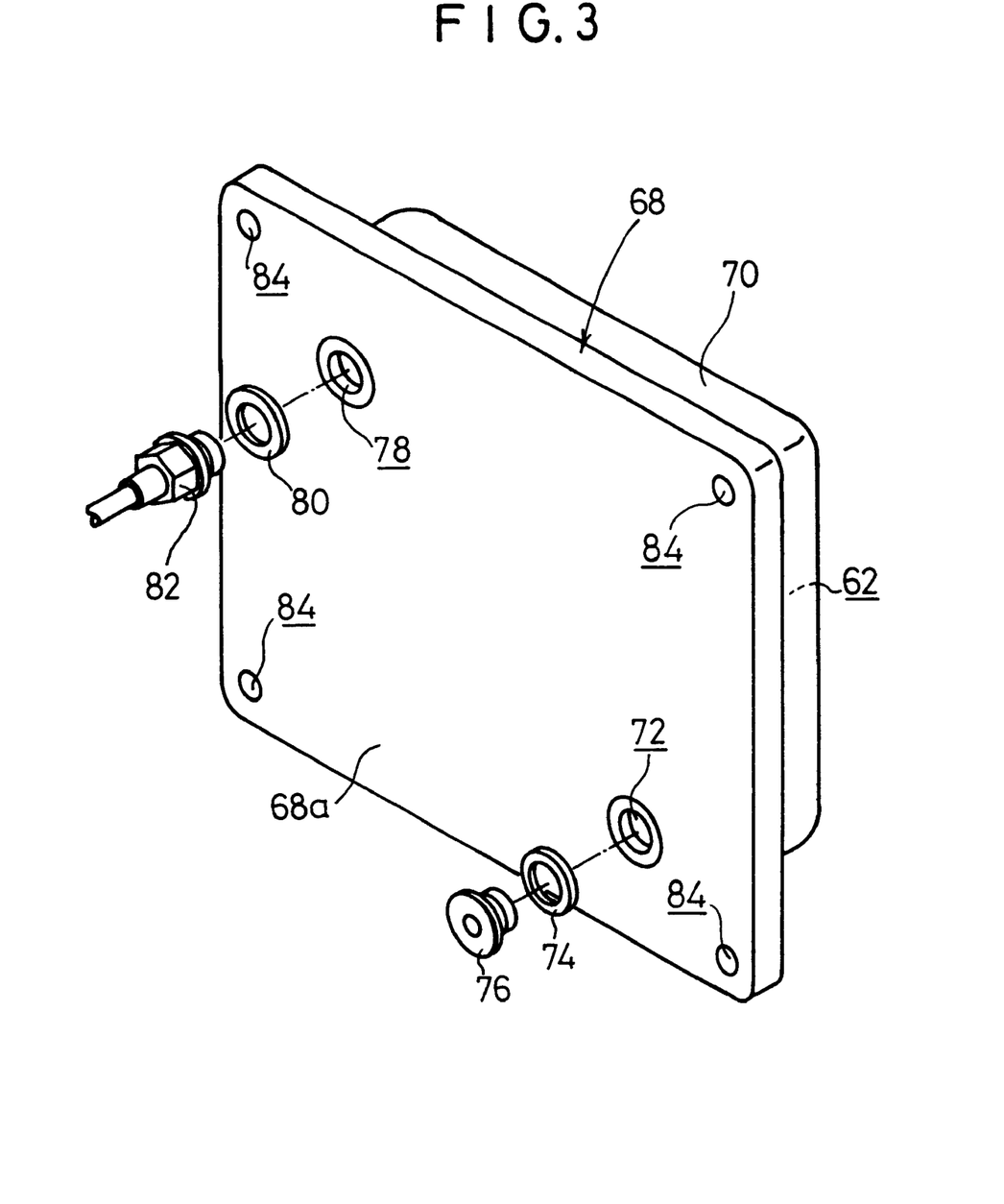
FIG. 3 is a perspective view of a backup plate of the fastening structure according to the first embodiment of the present invention.

As shown in FIG. 3, the backup plate 68, which is of a rectangular shape, has a liquid inlet port 72 defined therein at one corner thereof and opening at an outer surface thereof, for filling the silicone oil 64 into the liquid chamber 62. The liquid inlet port 72 is usually closed by a sealing washer 74 and a sealing bolt 76. The backup plate 68 also has a sensor attachment port 78 defined therein at a position diagonally opposite to the liquid inlet port 72, and a pressure sensor 82 is mounted in the sensor attachment port 78 by a washer 80. The pressure sensor 82 serves to detect the pressure of the silicone oil 64 in the liquid chamber 62. The backup plate 68 has four bolt holes 84 defined in the respective corners thereof.

As shown in FIG. 1, the pressurizing mechanism 66 comprises a pair of disc springs 86 having one end held against the outer surface 60a of the second end plate 60. An attachment plate 88 is disposed against an opposite end of the disc springs 86. The attachment plate 88, which is of a rectangular shape, has four bolt holes 90 defined in the respective corners thereof. Bolts 92 are inserted from the bolt holes 84 in the backup plate 68 into the bolt holes 90 in the attachment plate 88. Nuts 94 are threaded over respective externally threaded ends of the bolts 92 near the attachment plate 88. While the pressurizing mechanism 66 comprises the single pair of disc springs 86 in the illustrated embodiment, the pressurizing member 66 may comprise two or more pairs of disc springs 86.

Operation of the fastening structure 10 according to the first embodiment will be described below.

The fuel cells 14 combined with the first and second separators 16, 18 are stacked, and the terminal plates 52a, 52b, the insulating plates 56a, 56b, and the first and second end plates 58, 60 are placed against the opposite ends of the plurality of the fuel cells 14. The backup plate 68 is positioned in place with the liquid chamber 62 held against the outer surface 58a of the first end plate 58. The disc springs 86 and the attachment plate 88 are positioned in place on the outer surface 60a of the second end plate 60.

The bolts 92 are inserted from the bolt holes 84 in the backup plate 68 into the bolt holes 90 in the attachment plate 88. Then, the nuts 94 are threaded over the respective externally threaded ends of the bolts 92 near the attachment plate 88. The stacked fuel cells 14 are now firmly fastened between the backup plate 68 and the attachment plate 88. Specifically, each of the bolts 92 exerts a fastening load of 500 kg, and the silicone oil 64 which is sealed in the liquid chamber 62 has a pressure ranging from 6 to 7 kg/cm$^2$ while the fuel cell stack 12 is in operation. The anode and cathode electrodes 22, 24 of each of the fuel cells 14 each have a surface area of 150 mm ×150 mm.

When the fuel gas flows through the grooves 38 of each of the first separators 16, the fuel gas is supplied to the anode electrode 22 of each of the fuel cells 14. When the oxidizing gas flows through the grooves 48 of each of the second separators 18, the oxidizing gas is supplied to the cathode electrode 24 of each of the fuel cells 14. The coolant is supplied to the grooves 40, 50 of the first and second separators 16, 18 for cooling the fuel cells 14 to a predetermined temperature. Electrons are generated in the fuel cells 14 and flow through the terminal plates 52a, 52b to the load 54 where they are utilized as DC electric energy.

According to the first embodiment, the liquid chamber 62 is positioned against the outer surface 58a of the first end plate 58 with the flexible metal sheet 70 interposed therebetween, and the pressure of the silicone oil 64 filled in the liquid chamber 62 uniformly presses the first end plate 58 against the plurality of the fuel cells 14. Therefore, the first end plate 58 applies a uniform surface plate to the first and second separators 16, 18 for thereby imparting desired fastening forces to each of the fuel cells 14, which is capable of efficiently maintaining a desired level of performance for electric energy generation.

Even if the backup plate 68 is deformed under the pressure of the silicone oil 64 in the liquid chamber 62, the silicone oil 64 can apply a uniform surface pressure to the first end plate 58. Therefore, the backup plate 68 may be considerably thin. The presence of the backup plate 68 allows the first end plate 58 to be also thin. As a consequence, the fuel cell stack 12 can be reduced in weight and made compact as a whole.

Since the liquid chamber 62 is positioned on the outer surface 58a of the first end plate 58, the first end plate 58 may have various holes for supplying the fuel gas, the oxidizing gas, and the coolant to the fuel cells 14. Accordingly, the fuel cell stack 12 can effectively be simplified in overall structure.

The disc springs 86 are disposed on the outer surface 60a of the second end plate 60. The disc springs 86 are effective in uniformly pressurizing the second end plate 60 toward the first end plate 58, and also in effectively absorbing the difference between an expansion of the fuel cell stack structural body including the fuel cells 14 and an expansion of the bolts 92 due to their different coefficients of expansion.

The pressure of the silicone oil 64 in the liquid chamber 62 is detected by the pressure sensor 82 mounted on the backup plate 68. The amount of the silicone oil 64 in the liquid chamber 62 may be adjusted on the basis of the pressure of the silicone oil 64 in the liquid chamber 62 which is detected by the pressure sensor 82.

Figure 4:
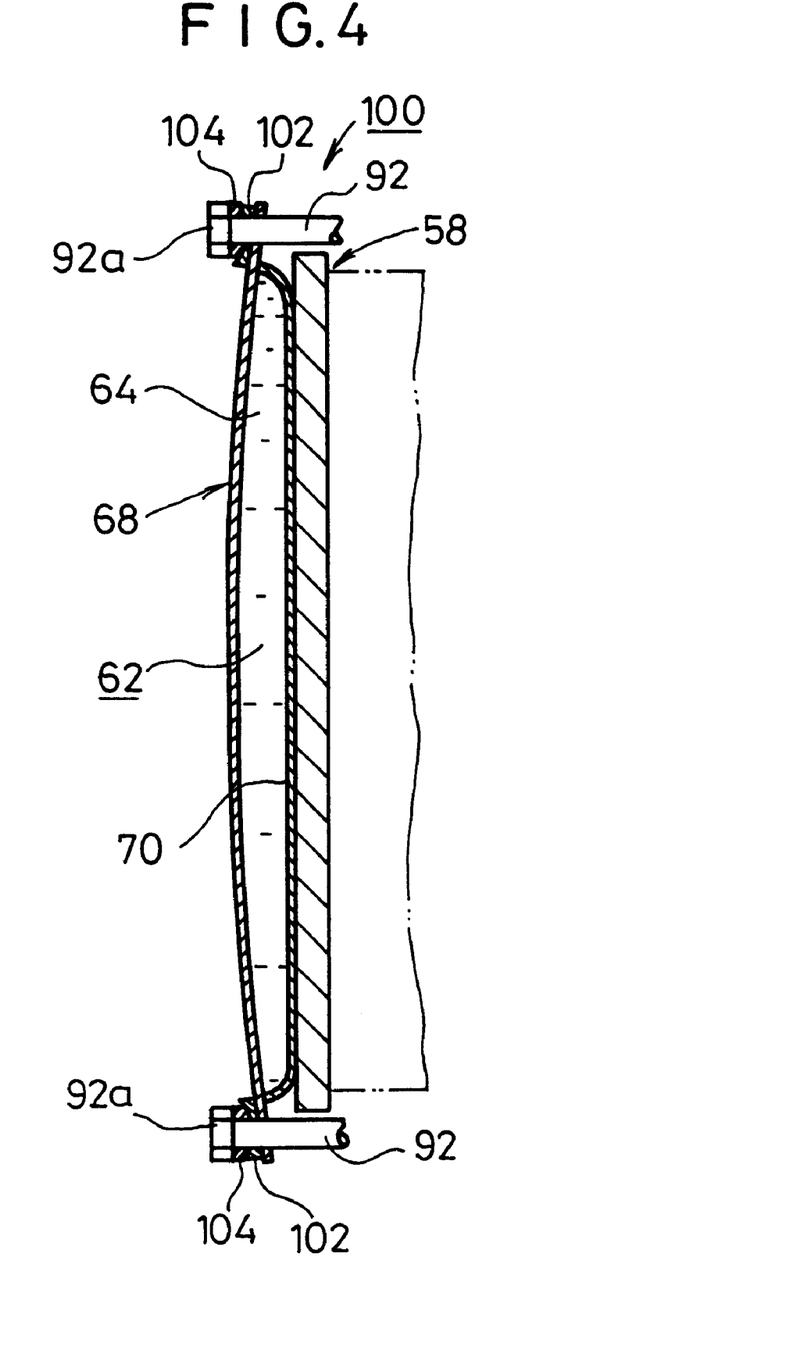
FIG. 4 is a fragmentary horizontal cross-sectional view of a fastening structure according to a second embodiment of the present invention.

FIG. 4 fragmentarily shows a fastening structure 100 according to a second embodiment of the present invention. Those parts of the fastening structure 100 which are identical to those of the fastening structure 10 according to the first embodiment are denoted by identical reference characters, and will not be described in detail below.

In the fastening structure 100, partly spherical washers 102 and partly spherical seats 104 are disposed between bolts 92a of the bolts 92 and the backup plate 68. When the bolts 92 are fastened to pressurize the fuel cells 14, the backup plate 68 is flexed outwardly with its corners retained in place by the partly spherical washers 102 and the partly spherical seats 104. Since the partly spherical washers 102 and the partly spherical seats 104 permit the corners of the backup plate 68 to be angularly displaced with respect to the bolts 92, they prevent the backup plate 68 from developing undue stresses at the corners thereof near the bolts 92. Therefore, the backup plate 68 is protected from damage due to such undue stresses.

Figure 5:
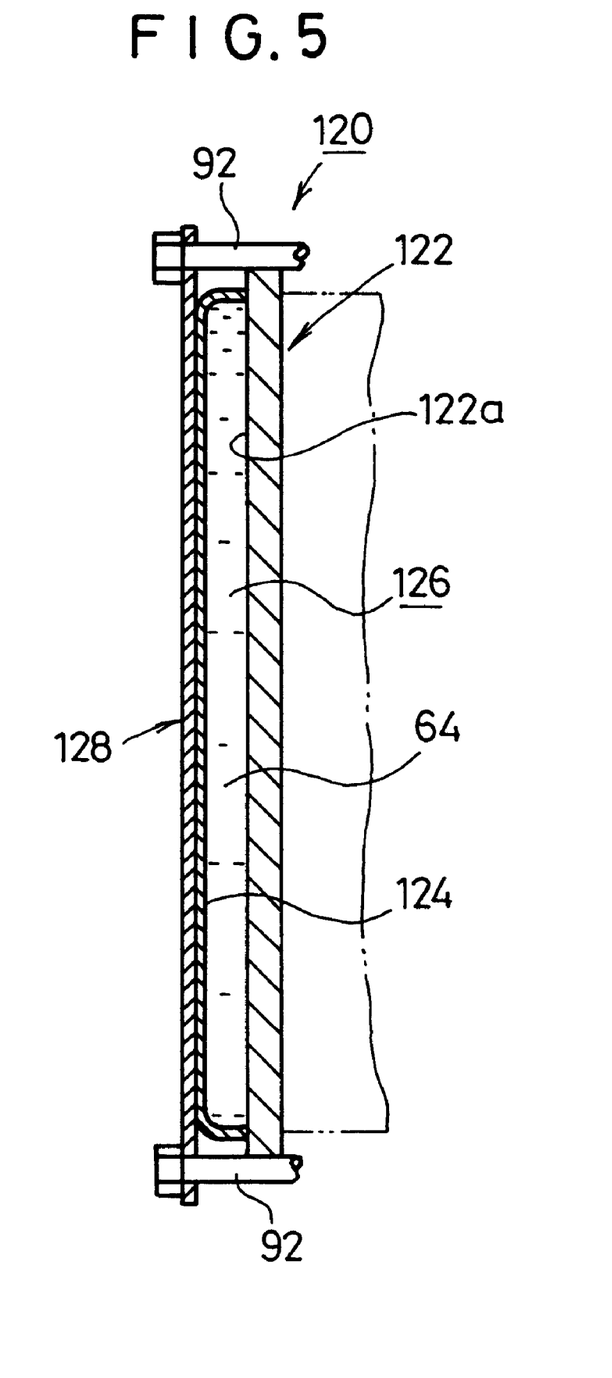
FIG. 5 is a fragmentary horizontal cross-sectional view of a fastening structure according to a third embodiment of the present invention.

FIG. 5 fragmentarily shows a fastening structure 120 according to a third embodiment of the present invention.

As shown in FIG. 5, a flexible metal sheet 124 such as a thin aluminum sheet is fixed by welding, brazing, or adhesive bonding to an outer surface 122a of an end plate 122. A liquid chamber 126 filled with a silicone coil 64 is defined between the flexible metal sheet 124 and the end plate 122. A backup plate 128 is positioned next to the liquid chamber 126, which is sandwiched between the backup plate 128 and the outer surface 122a of the end plate 122. The backup plate 128 is pressed toward the end plate 122 by bolts 92. A uniform surface pressure is applied to the end plate 122 by the silicone oil 64 in the liquid chamber 126. The fastening structure 120 offers the same advantages as those of the fastening structure 10 according to the first embodiment.

Figure 6:
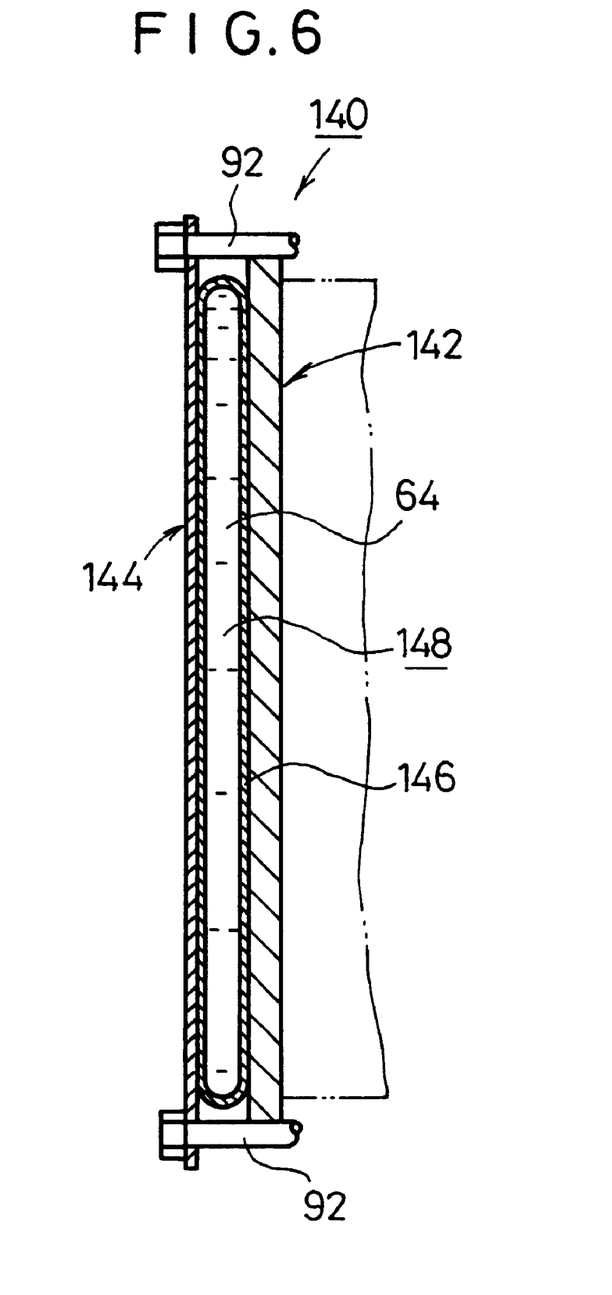
FIG. 6 is a fragmentary horizontal cross-sectional view of a fastening structure according to a fourth embodiment of the present invention.

FIG. 6 fragmentarily shows a fastening structure 140 according to a fourth embodiment of the present invention.

As shown in FIG. 6, a liquid chamber 148 defined by a separate hollow rectangular enclosure made of a flexible metal sheet 146 such as a thin aluminum sheet is interposed between an end plate 142 and a backup plate 144. The liquid chamber 148 is filled with a silicone oil 64. The fastening structure 140 offers the same advantages as those of the fastening structure 10 according to the first embodiment.

Figure 7:
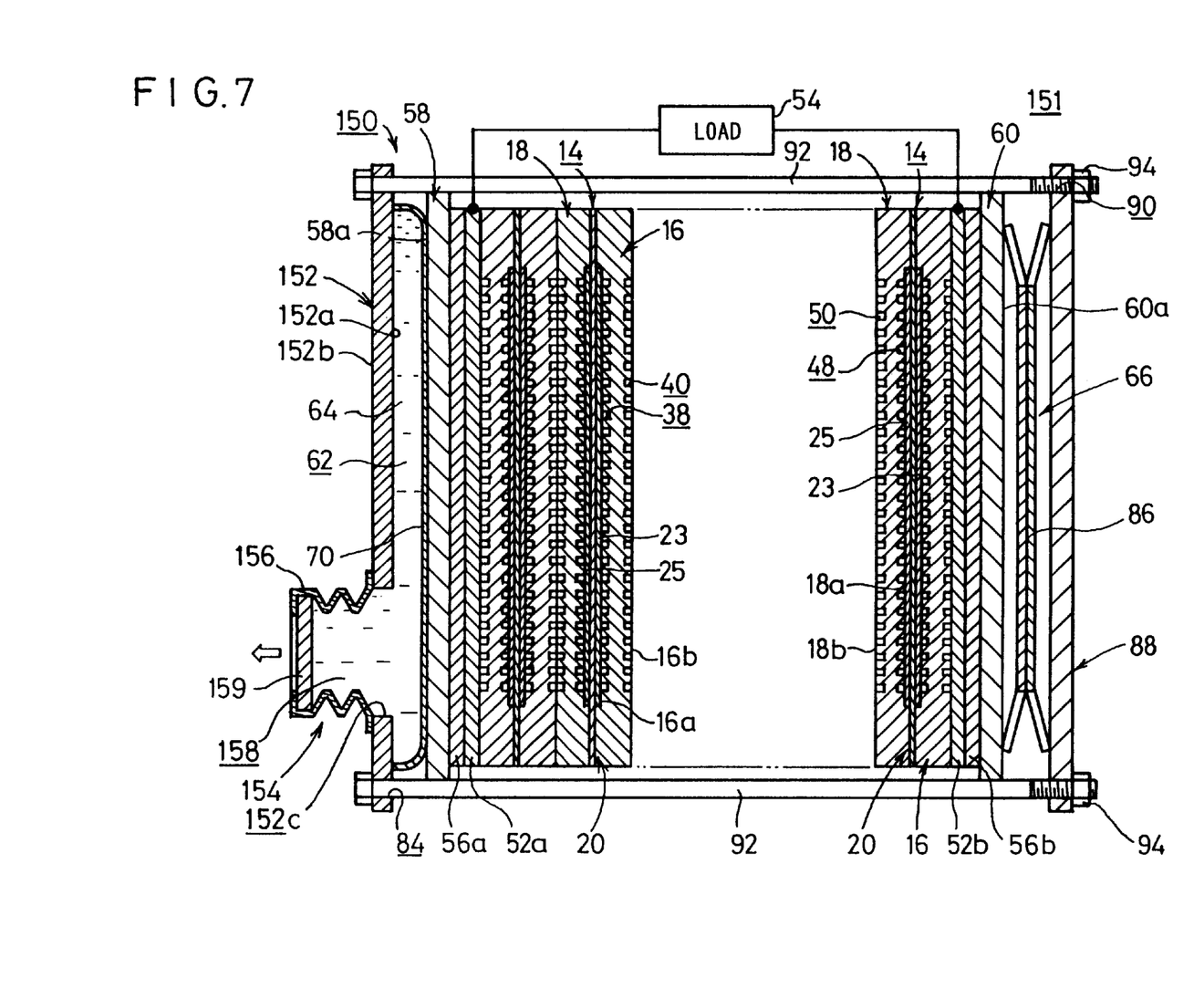
FIG. 7 is a horizontal cross-sectional view of a fuel cell stack which incorporates a fastening structure according to a fifth embodiment of the present invention.

FIG. 7 fragmentarily shows a fuel cell stack 151 which incorporates a fastening structure 150 according to a fifth embodiment of the present invention. Those parts of the fuel cell stack 151 which are identical to those of the fuel cell stack 12 shown in FIG. 1 are denoted by identical reference characters, and will not be described in detail below.

As shown in FIG. 7, the fastening structure 150 has a relatively thick backup plate 152, and the liquid chamber 62 is defined by the flexible metal sheet 70 fixed to an inner surface 152a of the backup plate 152. An inner pressure control unit 154 comprising a bellows 156 has an end fixed to an outer surface 152b of the backup plate 152. The bellows 156 has an inner pressure regulating chamber 158 defined therein which communicates with the liquid chamber 62 through an opening 152c defined in the backup plate 152. The bellows 156 has an opposite end closed by a cap 159.

When the fuel cell stack 151 is in operation, the silicone oil 64 filled in the liquid chamber 62 is expanded with heat. At this time, a portion of the expanded silicone oil 64 flows from the liquid chamber 62 into the inner pressure regulating chamber 158 in the bellows 156, which is then flexibly expanded in the direction indicated by the arrow to increase its volume. Therefore, the bellows 156 can effectively take up the expansion of the silicone coil 64.

Consequently, even when there is an unwanted pressure buildup in the liquid chamber 62, the fuel cell stack 151 is vented from damage, and the contact resistance of the fuel cell stack 151 is prevented from suffering an undue increase which would otherwise be caused by an increased fastening load due to the unwanted pressure buildup in the liquid chamber 62. Desired fastening forces are reliably applied to the fuel cell stack 151 for efficiently maintaining a desired level of performance for electric energy generation.

Figure 8:
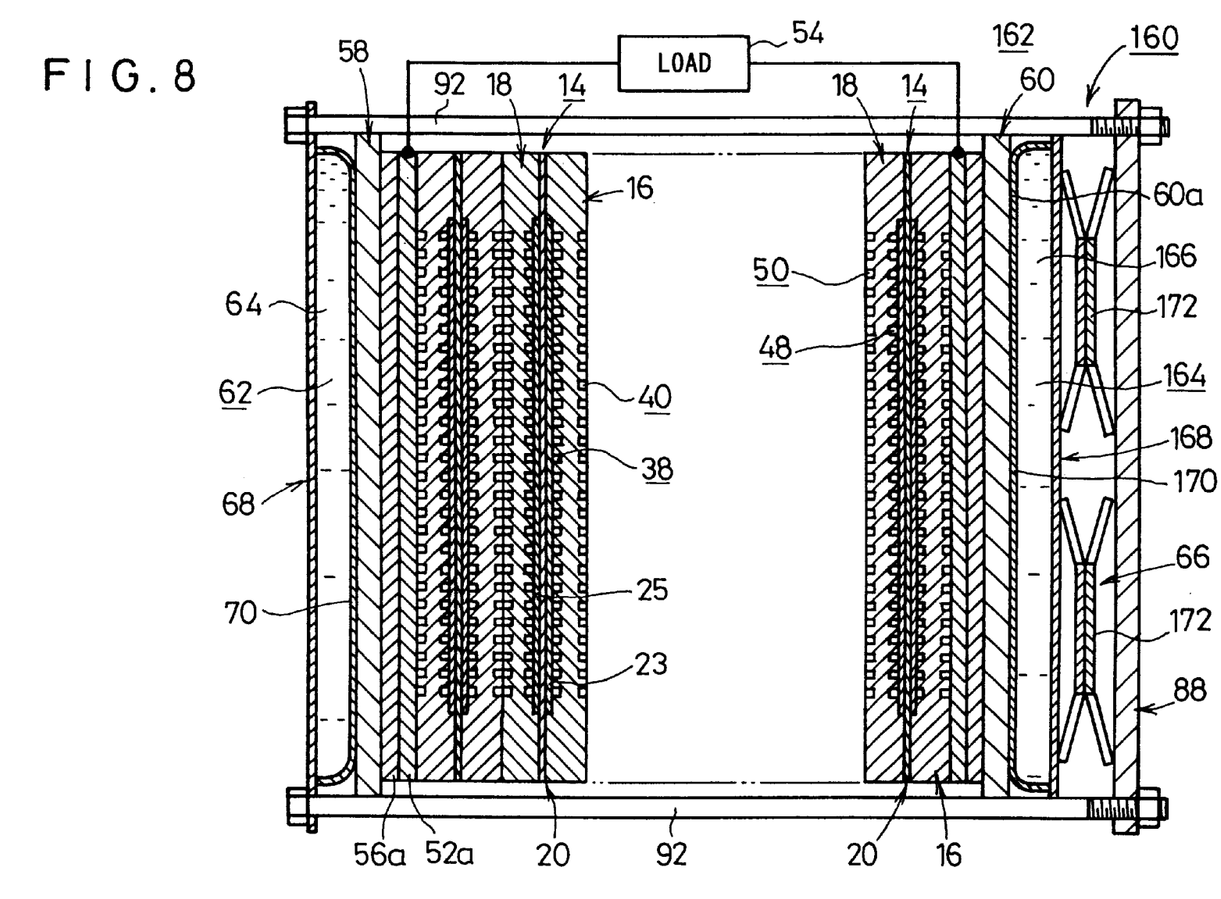
FIG. 8 is a horizontal cross-sectional view of a fuel cell stack which incorporates a fastening structure according to a sixth embodiment of the present invention.

FIG. 8 fragmentarily shows a fuel cell stack 162 which incorporates a fastening structure 160 according to a sixth embodiment of the present invention. Those parts of the fuel cell stack 162 which are identical to those of the fuel cell stack 12 shown in FIG. 1 are denoted by identical reference characters, and will not be described in detail below.

The fastening structure 160 has a liquid chamber 164 disposed on the outer surface 60a of the second end plate 60, a noncompressible surface-pressure generating liquid 166 such as silicone oil filled in the liquid chamber 164, and a backup plate 168 positioned next to the liquid chamber 164, which is sandwiched between the backup plate 168 and the second end plate 60.

A flexible metal sheet 170 such as a thin aluminum sheet is fixed by welding, brazing, or adhesive bonding to an inner surface of the backup plate 168 which faces the second end plate 60. The liquid chamber 164 is defined between the flexible metal sheet 170 and the backup plate 168. A pressurizing mechanism 66 disposed between the backup plate 168 and the attachment plate 88 comprises four pairs of disc springs 172, for example.

When the backup plate 168 and the attachment plate 88 are fastened to each other by the bolts 92, the first end plate 58 is pressed under the pressure of the silicone oil 64 in the liquid chamber 62, and the second end plate 60 is pressed under the pressure of the silicone oil 166 in the liquid chamber 164. Therefore, a uniform surface pressure is applied to the fuel cells 14 and the first and second separators 16, 18 which are stacked between the first and second end plates 58, 60. Accordingly, the contact resistance of the fuel cell stack 162 is effectively reduced to maintain a desired level of performance for electric energy generation.

Figure 9:
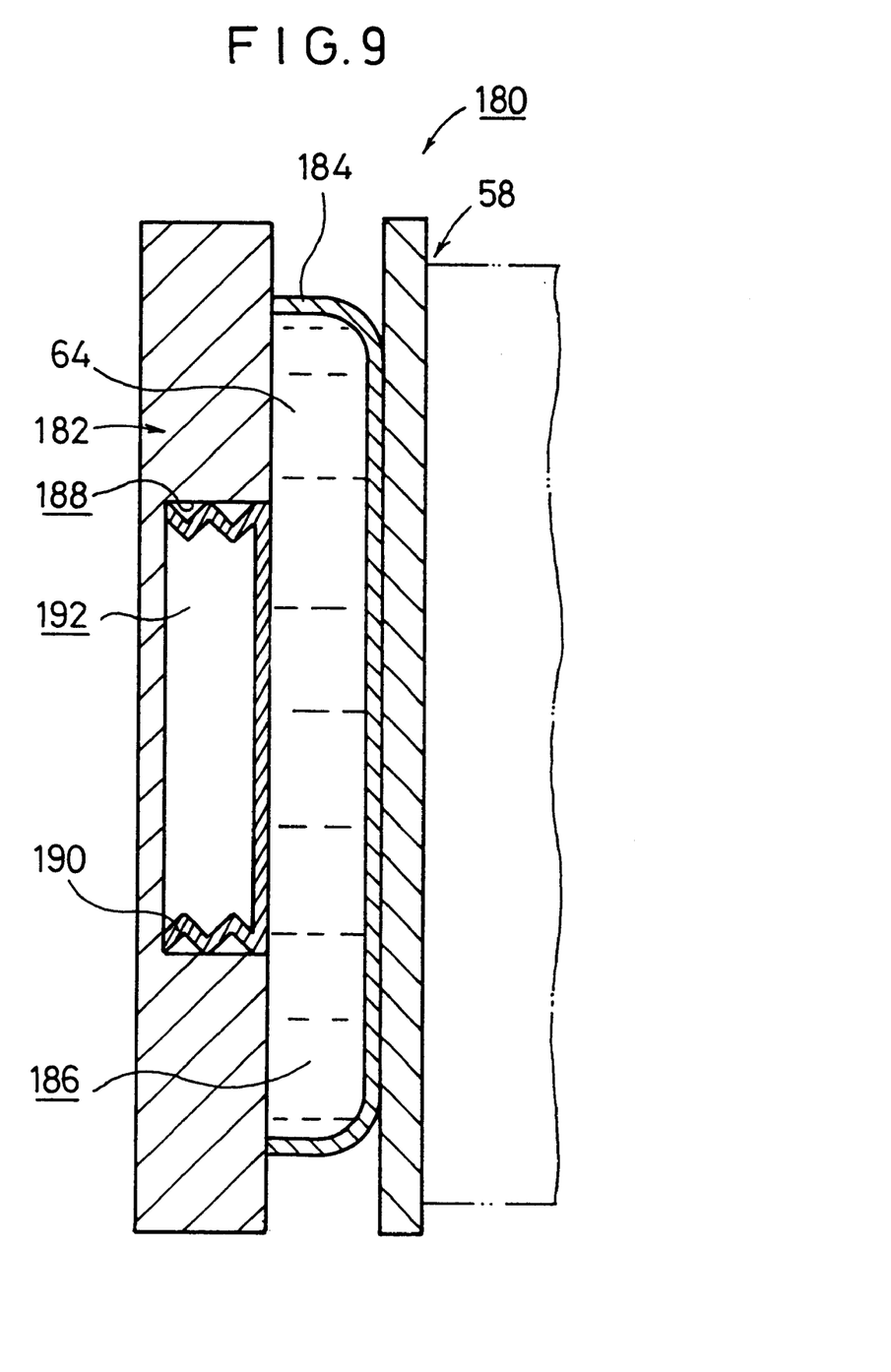
FIG. 9 is a fragmentary horizontal cross-sectional view of a fastening structure according to a seventh embodiment of the present invention.

FIG. 9 fragmentarily shows a fastening structure 180 according to a seventh embodiment of the present invention.

As shown in FIG. 9, the fastening structure 180 has a backup plate 182 and a thin aluminum sheet 184 fixed to a surface of the backup plate 182 which faces a first end plate 58. A liquid chamber 186 is defined between the thin aluminum sheet 184 and the backup plate 182. The liquid chamber 186 is filled with silicone oil 64. The backup plate 182 has a cavity 188 defined therein which has a predetermined depth, in the transverse direction of the backup plate 182, from the surface of the backup plate 182 which faces a first end plate 58. A bellows 190 is disposed in the cavity 188. The bellows 190 has a closed end facing the liquid chamber 186 and defines a gas chamber 192 between itself and the bottom of the cavity 188.

When the silicone oil 64 filled in the liquid chamber 186 is expanded with heat, the silicone oil 64 increases its volume thereby to press the closed end of the bellows 190 into the cavity 188. Therefore, the bellows 190 is elastically deformed into the cavity 188, reducing the volume of the gas chamber 192 and hence increasing the volume of the liquid chamber 186. Consequently, the bellows 190 can effectively take up the expansion of the silicone oil 64 to maintain a desired level of performance for electric energy generation.

Figure 10:
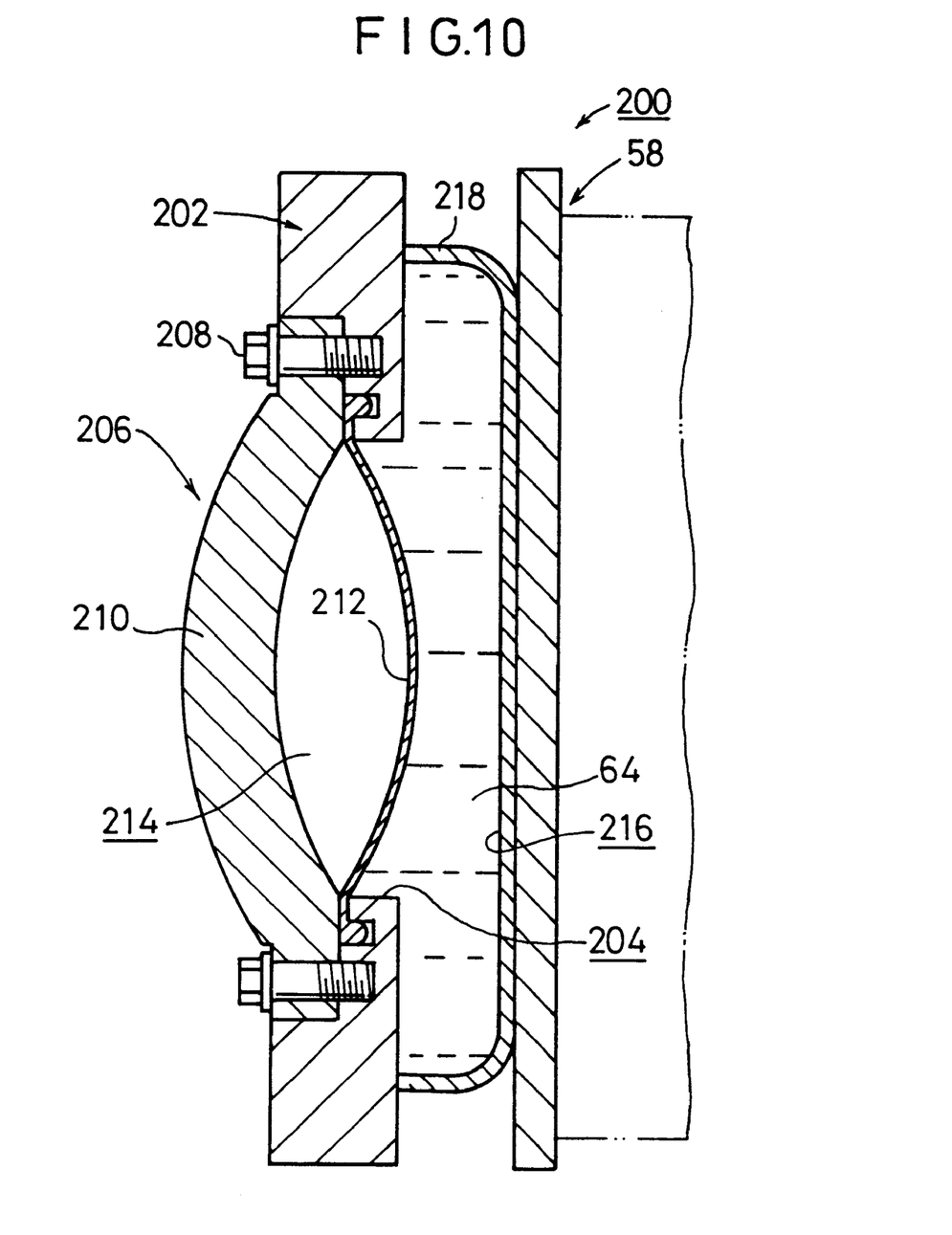
FIG. 10 is a fragmentary horizontal cross-sectional view of a fastening structure according to an eighth embodiment of the present invention.

FIG. 10 fragmentarily shows a fastening structure 200 according to an eighth embodiment of the present invention.

As shown in FIG. 10, the fastening structure 200 has a backup plate 202 having a stepped hole 204 defined transversely therethrough, and an accumulator 206 securely mounted on the backup plate 202 and positioned in the stepped hole 204. The accumulator 206 comprises an accumulator dome 210 fastened by bolts 208 to a large-diameter shoulder of the stepped hole 204, and an elastic bladder 212 having an outer circumferential edge fastened between the accumulator dome 210 and the large-diameter shoulder of the stepped hole 204. The bladder 212 and the accumulator dome 210 jointly define a gas chamber 214 therebetween. A thin aluminum sheet 218 is fixed to a surface of the backup plate 202 which faces a first end plate 58. A liquid chamber 216 filled with silicone oil 64 is defined between the thin aluminum sheet 184 and the back-up plate 182. The bladder 212 faces the liquid chamber 216.

When the silicone oil 64 filled in the liquid chamber 216 is expanded with heat, the silicone oil 64 increases its volume and presses the bladder 212 toward the accumulator dome 210, reducing the volume of the gas chamber 214 and hence increasing the volume of the liquid chamber 216. Consequently, the bladder 212 can effectively take up the expansion of the silicone oil 64 to maintain a desired level of performance for electric energy generation.

Figure 11:
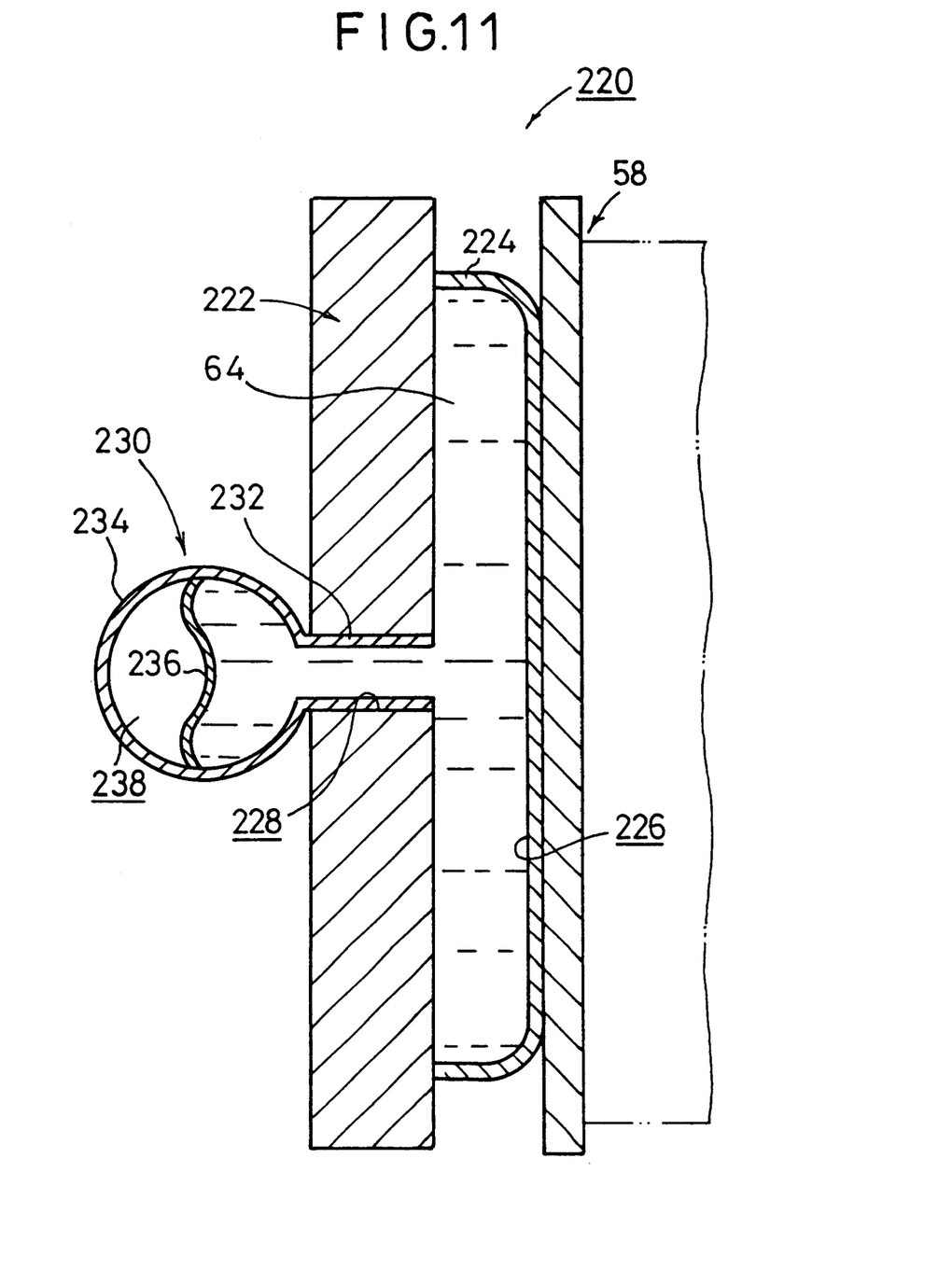
FIG. 11 is a fragmentary horizontal cross-sectional view of a fastening structure according to a ninth embodiment of the present invention.

FIG. 11 fragmentarily shows a fastening structure 220 according to a ninth embodiment of the present invention.

As shown in FIG. 11, the fastening structure 220 has a backup plate 222 and a thin aluminum sheet 224 fixed to a surface of the backup plate 222 which faces a first end plate 58. A liquid chamber 226 is defined between the thin aluminum sheet 224 and the backup plate 222. The liquid chamber 226 is filled with silicone oil 64. The liquid chamber 226 is connected to an accumulator 230 through a through hole 228 defined centrally in the backup plate 222. The accumulator 230 comprises a spherical casing 234 having a tube 232 extending radially outwardly into and fixed in the through hole 228, and an elastic partition 236 disposed in the spherical casing 234. The elastic partition 236 divides the interior space of the spherical casing 234 into a gas chamber 238 and another chamber which communicates with the liquid chamber 226 through the through hole 228.

When the silicone oil 64 filled in the liquid chamber 226 is expanded with heat, the silicone oil 64 increases its volume and presses the partition 236, reducing the volume of the gas chamber 238. Consequently, the partition 236 can effectively take up the expansion of the silicone oil 64 to maintain a desired level of performance for electric energy generation.

With the arrangement of the present invention, the liquid chamber is disposed on the outer surface of at least one of the end plates positioned on the respective opposite ends of the plurality of the fuel cells, and the liquid filled in the liquid chamber applies a uniform surface pressure to the fuel cells. Consequently, the performance of the fuel cells is effectively maintained at a desired level. The end plates can have defined therein holes or passages for the fuel gas, the oxidizing gas, and the coolant. The fuel cell stack can thus be reduced in weight and made compact as a whole.

Although certain preferred embodiments of the present to invention have been shown and described in detail, it should be understood that various changes and modifications may be made therein without departing from the scope of the appended claims.

What is claimed is:

1. A fastening structure in a fuel cell stack having a plurality of fuel cells each comprising an electrolyte and anode and cathode electrodes sandwiching the electrolyte, separators sandwiching each of the fuel cells, and end plates disposed on respective opposite ends of the plurality of fuel cells, comprising:

a liquid chamber disposed on an outer surface of at least one of the end plates remote from an inner surface thereof which faces the fuel cells;

a backup plate positioned next to said liquid chamber, said liquid chamber being sandwiched between said backup plate and said one of the end plates;

a surface-pressure generating liquid filled in said liquid chamber;

pressurizing means comprising a spring member disposed on an outer surface of the other end plate remote from an inner surface thereof which faces the fuel cells, for pressing said fuel cells toward said one of the end plates; and an attachment plate disposed adjacent to said pressurizing means.

2. A fastening structure according to claim 1, wherein said backup plate is more flexible than said one of the end plates, and further comprising fasteners for fastening said backup plate and said attachment plate to each other thereby to fasten said plurality of fuel cells.

3. A fastening structure according to claim 2, wherein said liquid chamber is defined by a flexible metal sheet.

4. A fastening structure according to claim 3, wherein said flexible metal sheet is fixed to a surface of said backup plate.

5. A fastening structure according to claim 3, wherein said flexible metal sheet is fixed to a surface of said one of the end plates.

6. A fastening structure according to claim 3, wherein said flexible metal sheet is in the form of a hollow enclosure and interposed between said one of the end plates and said backup plate.

7. A fastening structure according to claim 2, further comprising:

inner pressure control means mounted on said backup plate and communicating with said liquid chamber, for regulating an inner pressure of said liquid chamber.

8. A fastening structure according to claim 1, further comprising:

fasteners for fastening said backup plate and said attachment plate to each other thereby to fasten said plurality of fuel cells.

9. A fastening structure according to claim 8, further comprising:

inner pressure control means mounted on said backup plate and communicating with said liquid chamber, for regulating an inner pressure of said liquid chamber.

10. A fastening structure according to claim 1, wherein said pressurizing means comprises at least a pair of disc springs.

11. A fastening structure according to claim 1, wherein said spring member is disposed on the outer surface of said other end plate on one side only of said fastening structure.

12. A fastening structure according to claim 11, wherein said liquid chamber is disposed on the outer surface of an end plate on the other side only of said fastening structure.

* * * * *